Oct. 22, 1963   J. F. ORLOFF   3,107,572
RIVET WITH A SERRATED PIN AND AN ANNULAR LOCKING MEMBER
Filed June 6, 1960   4 Sheets-Sheet 1
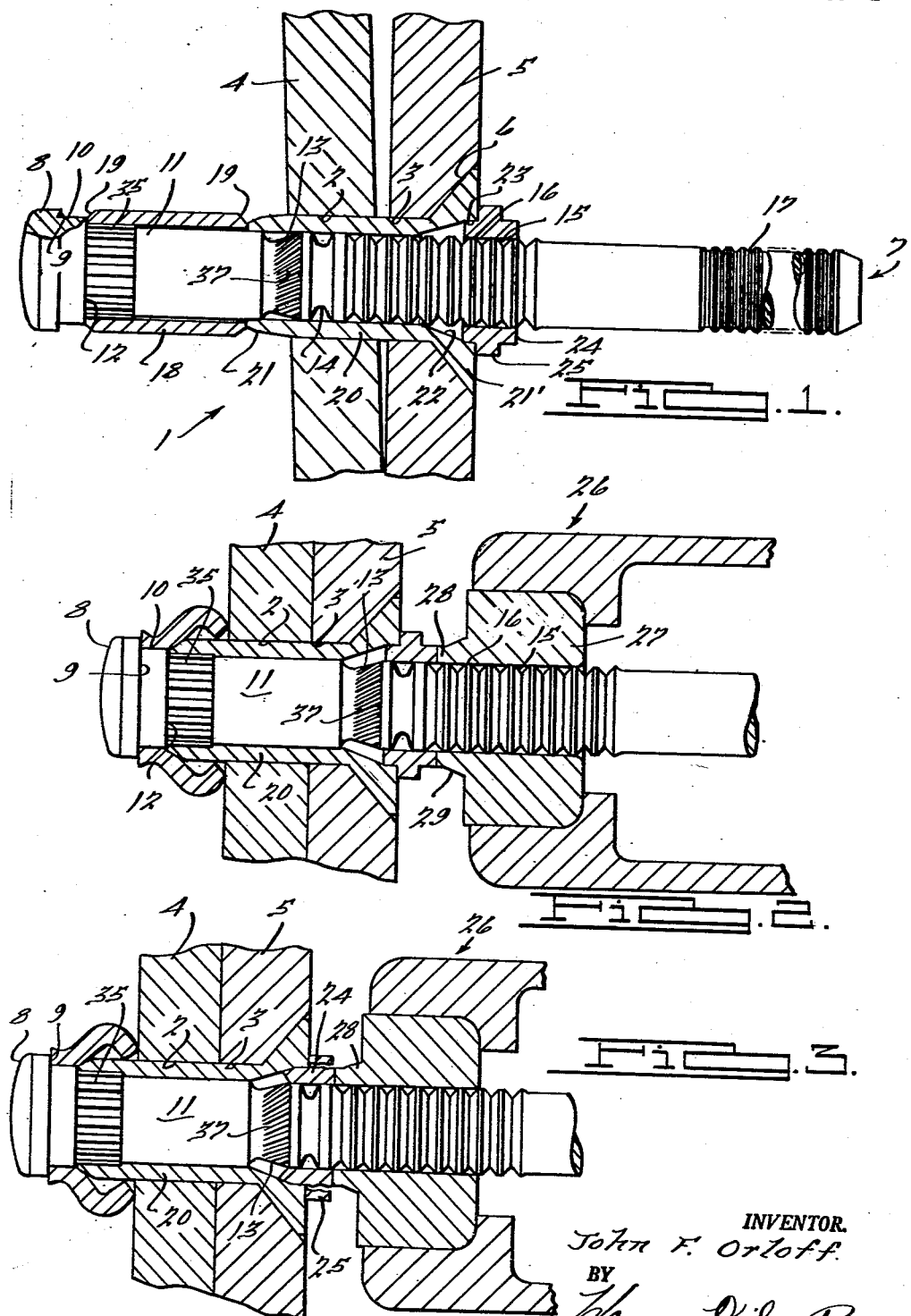
INVENTOR.
John F. Orloff
BY
Harness, Dickey & Pierce
ATTORNEYS Oct. 22, 1963 J. F. ORLOFF 3,107,572
RIVET WITH A SERRATED PIN AND AN ANNULAR LOCKING MEMBER
Filed June 6, 1960 4 Sheets-Sheet 2
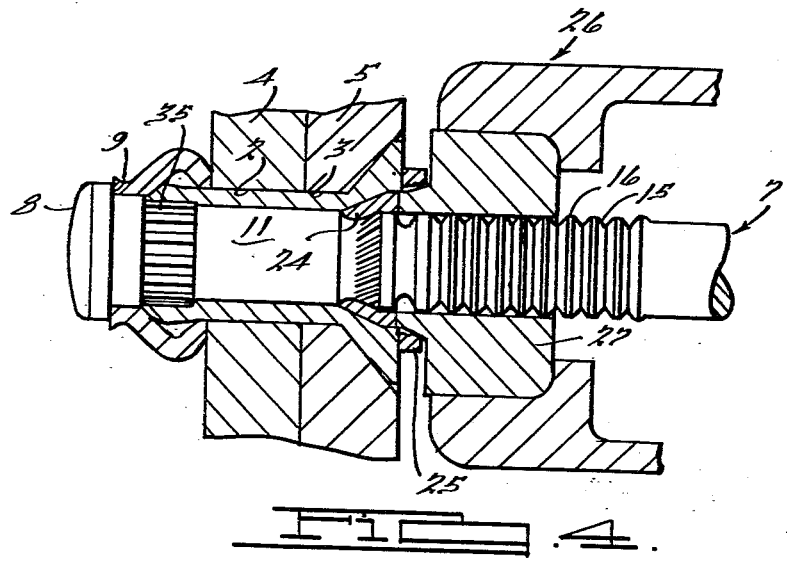
FIG. 4.
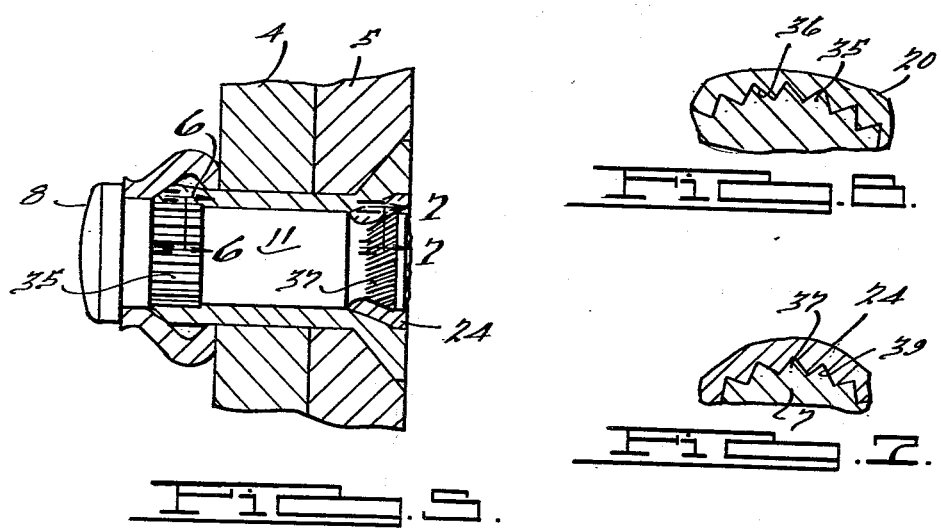
FIG. 5.
FIG. 6.
FIG. 7.
INVENTOR.
John F. Orloff
BY
Barnes, Dickey & Pierce
ATTORNEYS

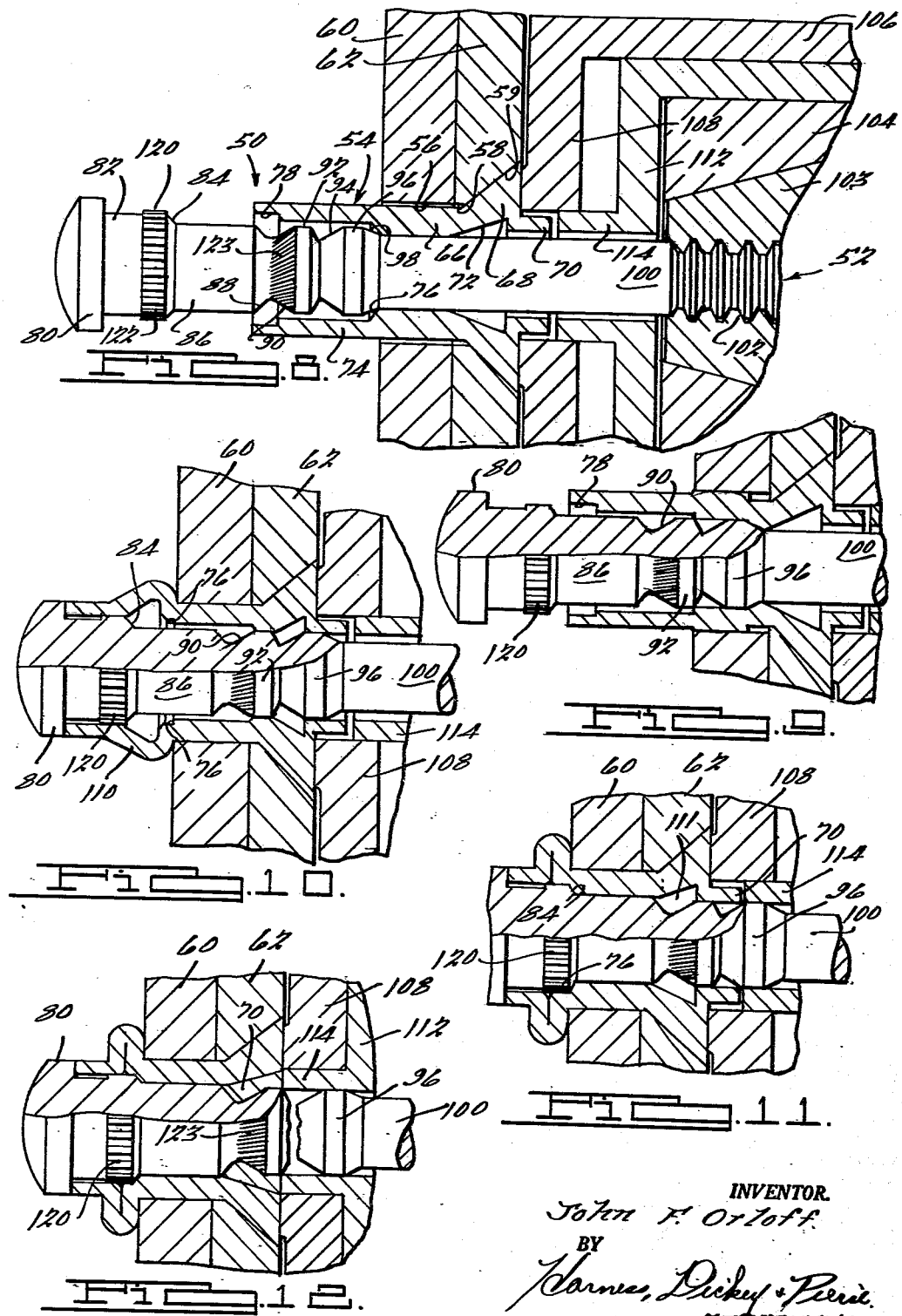

Oct. 22, 1963 J. F. ORLOFF 3,107,572
RIVET WITH A SERRATED PIN AND AN ANNULAR LOCKING MEMBER
Filed June 6, 1960 4 Sheets-Sheet 4
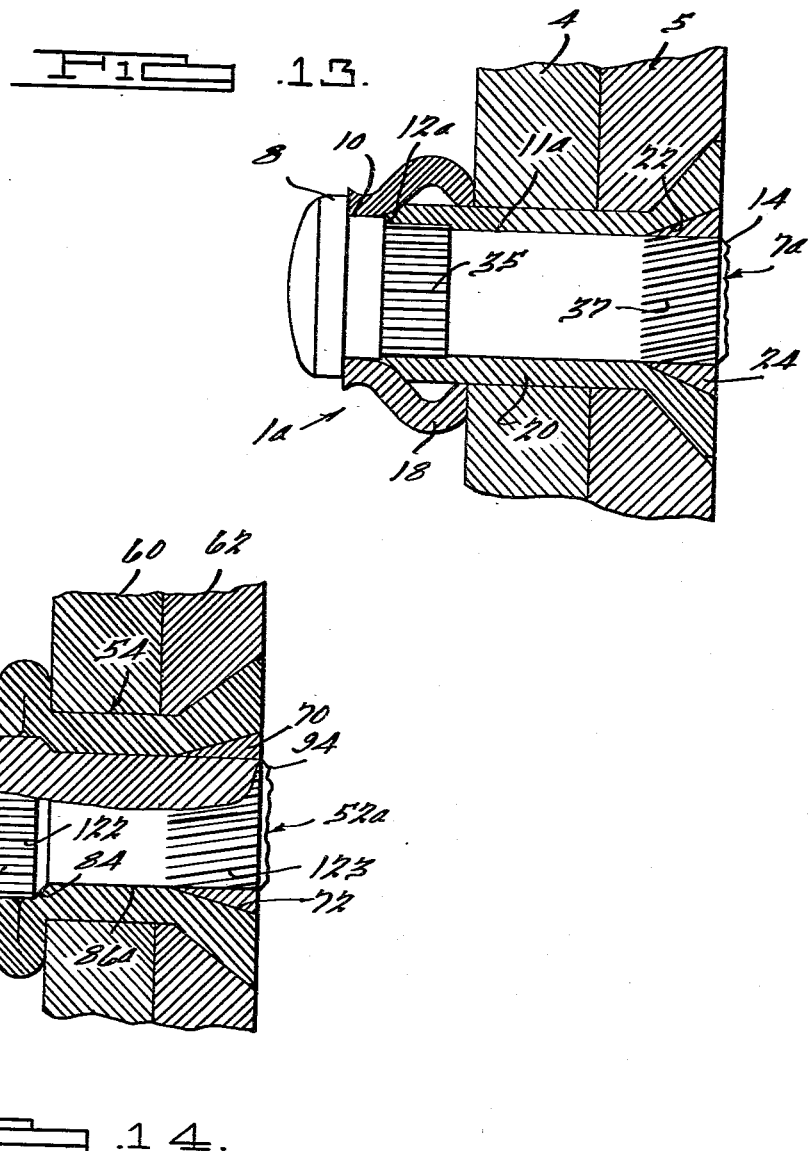
INVENTOR.
John F. Orloff.
BY
Harness, Dickey & Pierce.
ATTORNEYS.

United States Patent Office 3,107,572
Patented Oct. 22, 1963

3,107,572
RIVET WITH A SERRATED PIN AND AN
ANNULAR LOCKING MEMBER
John F. Orloff, Mount Clemens, Mich., assignor to Huck Manufacturing Company, Detroit, Mich., a corporation of Michigan
Filed June 6, 1960, Ser. No. 34,064
2 Claims. (Cl. 85—40)

This invention relates generally to blind fasteners and more particularly to an improved fastener of the type illustrated in United States Patents Nos. 2,887,003 and 2,526,235.

The fastener of this invention is a "blind fastener" which means that it is completely applied from one side only of the work. The assembled fastener consists of a pin, a sleeve assembly, which may consist of a single sleeve member or a two-part sleeve, which is expanded on the blind side of the work, and a locking collar or ring. The assembly is applied through aligned openings in the plates to be fastened together, so that the sleeve assembly engages the walls of the openings and projects therethrough, with the expanding sleeve assembly and the head end of the pin projecting beyond the inner surface of the inner panel. The opposite end of the pin is provided with pullgrooves and projects beyond the side where it is adapted to be engaged by a pull gun. By manipulation of the pull gun, the pin is pulled so as to expand one end of the sleeve assembly and form a blind head on the blind side of the work. After the blind head is formed, through the reaction of an anvil in the pull gun, the locking collar is forced into a locking space formed by a locking groove in the pin and a cooperating space in the sleeve assembly to thus lock the fastener in place. The projecting end of the pin is thereafter broken off substantially flush with the adjacent head of the filler sleeve.

In the fastener of this invention, means are provided for preventing relative rotation of the pin and the sleeve assembly after the fastener has been installed, since such relative rotation permits loosening of the fastener under circumstances such as vibration of the connected panels or parts. It is also important that means be provided for preventing relative movement of the pin and the assembled locking collar, since if the collar becomes loose on the pin, the pin may move relative to the sleeve assembly so as to loosen the connection of the parts.

The primary object of the present invention, therefore, is to provide improved fasteners of the type illustrated in United States Patents Nos. 2,887,003 and 2,526,235, which include means for preventing rotation of the pin relative to the sleeve assembly and movement of the locking collar relative to the pin.

A further object of this invention is to provide improved fasteners of the above type which have portions of the pin serrated or formed with locking projections or lands which are mechanically locked to the sleeve assembly and to the locking collar so as to prevent movement of the pin relative to the sleeve assembly and the locking collar.

Further objects, features and advantages of this invention will become apparent from a consideration of the following description, the appended claims and the accompanying drawing in which:

FIGURE 1 is a cross sectional view, with some parts shown in elevation, illustrating a fastener assembled with the work prior to driving of the fastener, in accordance with one form of the present invention;

FIGURE 2 is a view similar to FIG. 1 showing a driving tool applied to the fastener and with the fastener in an intermediate stage of setting;

FIGURE 3 is a view similar to FIG. 2 showing a further stage in the fastener driving operation;

FIGURE 4 is a view similar to FIGS. 2 and 3 showing a still further stage in the fastener driving operation;

FIGURE 5 is a view similar to FIGS. 2–4 and showing the fastener as finally driven;

FIGURES 6 and 7 are fragmentary enlarged sectional views looking along the lines 6—6 and 7—7, respectively, in FIG. 5;

FIGURE 8 is a cross sectional view, with some parts in elevation, illustrating another form of the fastener of this invention assembled with the work prior to any driving of the fastener, and showing a driving tool applied to the fastener;

FIGURE 9 is a view similar to FIG. 8 showing the fastener in an intermediate stage of driving;

FIGURES 10, 11 and 12 are views similar to FIGS. 8 and 9 showing successive further stages of setting of the fastener;

FIGURE 13 is a sectional view, similar to FIG. 5, of a modified form of the fastener shown in FIGS. 1–7; and FIGURE 14 is a sectional view, similar to FIG. 12, of a modified form of the fastener shown in FIGS. 8–12.

With reference to the drawing, one form of the blind fastener of this invention, indicated generally at 1, is illustrated in FIGS. 1–5, inclusive, extending through a pair of aligned openings 2 and 3 in a pair of plates or panels 4 and 5, respectively, which are to be connected. In the illustrated embodiment, the panels 4 and 5 are shown as being separated and plate 5 is illustrated as having a countersink 6 formed on one side thereof. The panels 4 and 5 may be of metal, such as steel or aluminum, and in some installations may be composites of wood or metal or plastic.

The fastener 1 comprises a pin generally indicated at 7. The pin 7 is formed of an alloy steel, preferably heat treated, so that it is exceptionally hard. The pin 7 has a preformed head 8, which is slightly smaller than the diameter of the openings 2, so that it may project therethrough. The inner annular surface of the head, as indicated at 9, has an outwardly flared angle or undercut of approximately 10 degrees which, in the embodiment illustrated, is slightly exaggerated for purpose of illustration.

The pin 7 has an annular, smooth land 10 formed adjacent the head 9, with an adjacent portion 11 of reduced diameter providing an annular shoulder or step 12. An annular locking groove 13 is formed in the pin adjacent portion 11, and has a shape tapering inwardly to an increasing depth toward the head 8, as best shown in FIG. 1. A breakneck 14 is formed on the pin adjacent the locking groove with a land formed therebetween. The adjacent section of the pin is formed with a plurality of longitudinally spaced grooves 15, which are rolled therein, providing centering or guide lands 16 therebetween. The opposite end of the pin is provided with pull grooves 17, which are adapted to be engaged by the pull fingers of a pull gun in a manner similar to that for pulling the lockbolts disclosed in Huck Patents Nos. 2,114,493 and 2,531,048.

A sleeve assembly comprised of an expanding sleeve 18 is disposed over portion 11 of the pin with one end thereof abutting against the shoulder 12. The opposite ends of the expanding sleeve are chamfered, as indicated at 19. This is important to reduce the load differential required to bulb or buckle the expanding sleeve in extreme maximum and extreme minimum grip conditions. The expanding sleeve is preferably made of an austenitic stainless steel, annealed soft when it starts, but, as it is bulbed, it is worked to provide a hardness in the final set fastening.

A filler sleeve 20 is next disposed over the pin, and terminates at one end in an annular tapered portion 21 adjacent the expanding sleeve 18. In the embodiment illustrated, the opposite end is formed with a countersink head 21' to fit within the countersink 6, so that the final fastening is flush with the adjacent surface of panel 5. An inner annular cavity 22 is formed in the head of the filler sleeve and terminates in an annular axial portion 23.

A locking collar 24, having an annular flange 25, is press fitted onto the lands 16 with the inner end projecting inwardly against the annular portion 23 of the filler sleeve. The flange 25 abuts against the adjacent outer surface of the head 21'.

Adjacent the shoulder 12, the pin portion 11 is formed with longitudinally extending serrations or projections 35, each of which is illustrated as being of a substantially V-shape in cross section. When the fastener 1 is set by pulling the pin 7 into the sleeve 20 as shown in FIG. 4, the serrations 35 are moved longitudinally through the inner surface of the sleeve 20 so as to form grooves 36 therein in which the serrations 35 are located. Consequently, when the fastener 1 is fully set as illustrated in FIG. 5, the pin portion 11 is mechanically locked to the sleeve 20 by virtue of the disposition of the serrations 35 in the grooves 36. This assembly prevents relative rotation of the pin 7 and the sleeve 20.

The locking groove 13 in the pin 7 is formed with serrations or projections 37 which are inclined relative to the longitudinal axis of the pin 7. The serrations 37 may be either helical or straight on the pin 7 so long as they extend angularly with respect to the pin axis. The serrations or projections 37 are likewise of a substantially V-shape in cross section, so that when the locking collar 24 is driven into the locking groove 13, it is deformed so that it is forced across the serrations 37 and is mechanically locked to the pin 7 by virtue of the grooves 39 which are formed in the inner surface of the collar 24 by the serrations 37 on movement of collar 24 into the groove 13. Consequently, when the fastener has been fully driven as illustrated in FIG. 5, the locking collar 24 cannot be accidentally moved longitudinally of the pin 7 out of the locking groove 13.

The fastener is set by means of a pull gun partially and generally indicated at 26. The gun is not disclosed here in detail, but is similar in structure and operation to the guns disclosed in the above referred to Huck patents, except that the anvil 27 is of a different configuration. The anvil 27 has a protruding or projecting nose 28 in which the end matches the I.D. and O.D. of the locking collar, as best shown in FIG. 2. The projecting end is joined to the main body portion of the anvil 27 by means of a tapered or conical portion 29 for a purpose to be described hereinafter.

To set the fastener it is disposed through the openings of the panels as shown in FIG. 1. The gun 26 is applied over the projecting end of the pin 7, so that the pull grooves 17 are engaged by the fingers of the gun, as in the Huck patents above mentioned. As the trigger of the gun is operated, the pin 7 is pulled (to the right, viewing FIG. 1), so that the end of the expanding sleeve 18 adjacent the head 8 moves over the shoulder 12 and abuts against the under surface 9 of the head. The opposite end of the expanding sleeve is forced outwardly over the annular tapered portion 21 of the filler sleeve and, as the pin 7 is further pulled, the expanding sleeve is bulbed to the final position shown in FIG. 2.

At this stage in the setting of the fastener, the reaction of this pulling load is taken by the flange 25 of the locking collar 24, as it will be understood that, during the pulling of the pin, the projecting end 28 of the anvil 27 is reacting against the adjacent face of the locking collar 24.

Further bulbing of the expanding sleeve 18 is prevented because of the abutment of the adjacent end of the filler sleeve 20 against the annular shoulder or step 12 on the pin, as shown in FIG. 2. The shoulder 12 is accurately positioned in the design of the pin in relation to the length of the filler sleeve 20, so that the locking portions of the pin and filler sleeve, that is, the overlying position of the locking groove 13 and the annular cavity 22, are in perfect aligned positions to receive the locking collar and the serrations 35 project into the sleeve 20.

Referring now to FIGS. 2 and 3, since the full reaction of the pull on the pin is taken at this stage between the shoulder 12 and the adjacent end of the filler sleeve 20 and the bulbed sleeve 18, the pulling forces build up to a point where the flange 25 on the locking collar 24 is sheared off, as shown in FIG. 3, and the collar 24 is then forced into the space formed by the locking groove 13 and the cavity 22, as shown progressively in FIGS. 3 and 4. The strength of the flange 25 prior to shearing must be greater than the pull required to bulb the expanding sleeve sufficient and to properly align the locking cavities by seating the shoulder 12 against the end of the filler sleeve 20; and the maximum strength of the flange 25 must be less than the minimum breakneck strength of the pin 7. The annular flange 25, as shown in FIG. 3, is then forced over the conical portion 29 of the anvil as the lock progresses to its final position, as shown in FIG. 4, and this causes the flange or ring 25 to split and drop away from a position between the anvil of the gun and the head on the filler sleeve.

When the locking collar 24 is forced to its innermost position, the force is further built up on the gun to cause the pin to break at the breakneck 14, so that the final fastening is such as that shown in FIG. 5. It will be noted that the broken end of the pin is substantially flush or underflush with the adjacent outer surface of the locking sleeve.

As mentioned above, the head 8 of the pin is preferably provided with an undercut or angle of approximately 10 degrees, as indicated at 9. This is important in holding the adjacent end of the expanding sleeve in place, particularly for maximum grip conditions where the expanding sleeve may have a tendency to slip over the head of the pin.

The rivet construction shown in FIGS. 8–12, inclusive, is similar to that already described in that the fastener 50 shown therein includes a pin 52 which is drawn into a sleeve assembly consisting of a single sleeve 54 so as to expand the sleeve on the blind side of the work to thereby form a head on the fastener on the blind side, and a locking ring is utilized for holding the pin and sleeve in fixed relative positions when the fastener is fully driven. The sleeve 54 is shown extending through aligned openings 56 and 58 in a pair of plates 60 and 62, respectively, to be connected. The sleeve 54 is provided with a wall portion 66 having a smaller internal diameter that is adapted to lie within the plate openings 56 and 58, the latter of which is formed with a countersink 59. Outwardly of the portion 66, tubular member 54 has a flush head 68 provided with an axially outwardly extending tubular locking portion 70 and an inner inclined surface 72 which forms part of a locking recess, as will more clearly be explained hereinafter. Beyond the plate 60, the sleeve 54 has a tubular extension 74 of larger internal diameter and this extension at its inner end has an internal stop shoulder 76. At its outer end, the extension 74 is provided with a countersunk portion 78 to facilitate expansion of the extension 74 without rupture thereof.

The pin 52 has a head 80 for engaging the outer end of the tubular extension 74 and adjacent the head 80 a first portion 82 is provided which is substantially equal in diameter to the tubular extension 74. A tapered shoulder 84 is formed at the outer end of the pin portion 82 and this shoulder leads to a smaller pin portion 86. At the outer end of the latter, surfaces 88 and 90 form a locking groove in the pin for receiving the locking ring 70 after it is severed from the head 68. Outwardly of the surface 90, a short cylindrical surface 92 is provided, the outer end of that surface joins a breakneck or groove 94. This groove outwardly joins a cylindrical surface 96 and beyond the latter an expanding shoulder 98 is provided which is adapted to expand the portion 66 of the sleeve 54. The shoulder 98 joins an outer cylindrical pin section 100 having a slight press fit with the portion 66 of the tubular member 54 so as to hold the parts in an initially assembled relation. At the outer end of portion 100, grooves 102 are provided which are adapted to be gripped by the jaws of a fastener applying tool.

The fastener 50 is adapted to be set by mechanism which includes jaws 103 engageable with the grooves 102 in the pin and these jaws are adapted to be moved by a jaw actuating member 104 so as to apply a pull to the pin 52. When the jaw actuating member 104 is pulled toward the right so as to apply tension to the pin 52 the reaction force first is applied through a sleeve 106 and anvil 108 to the outer face of the head 68 of the tubular member 54. When the pull on the pin increases sufficiently, the riveting mechanism automatically operates to cause a secondary anvil 112 to move into engagement with the sleeve extension 70 so as to take the reaction previously taken by the anvil 108. This anvil has a tubular portion 114 which engages the extension 70 and when the reaction to the pull on the pin is taken by the anvil 112 and portion 114, the extension 70 is sheared from the head 68 and moves into the recess in the head along the inclined surface 72.

When the riveting mechanism is initially actuated, the first thing to occur is the expansion of a portion 66 of the sleeve 54 by the shoulder 98 to fill the rivet hole as shown in FIG. 9. It will be noted, however, that since the shoulder 98 and cylindrical surface 96 are not as large in diameter as the portion 74, a part of shoulder 76 still remains following the expanding of portion 66. Following the hole filling operation, the head 80 on the pin engages the outer end of the tubular portion 74 and formation of a bulb 110 in sleeve 54 takes place as seen in FIG. 10. After the bulb head is formed, the shoulder 84 on the pin engages the shoulder 76 in the tubular member 40 and pin motion is stopped with the parts in the positions shown in FIG. 11.

A section 120 of the pin portion 82 adjacent the shoulder 84 is formed with longitudinally extending serrations or projections 122, like the serrations 35, which extend longitudinally of the pin 52 and are of a diameter to bite into the extension 74 of the sleeve 54 during movement of the pin 52 from the position shown in FIG. 9 to the position shown in FIG. 11, like the serrations 35 bite into the sleeve 20 as shown in FIG. 6. Consequently, in the position of the pin 52 shown in FIG. 11, the serrations 122 are firmly embedded in the tubular member 54 so as to positively prevent any relative rotation of the pin 52 and the sleeve 54. The shape of the bulb 110 formed on the blind side of plates 60 and 62 is not important to this invention so long as a bulb is formed which will function as a head to prevent movement of the rivet through plates 60 and 62 and so long as the serrations 122 are locked in the sleeve 54.

The grooves on the pin and the tubular member which form the recess 111 for the locking metal 70 are now in matching or complemental positions as shown in FIG. 11. After this occurs, action of the secondary anvil 112 causes the extension 70 to be broken off from the pin head 68 and moved into the locking recess, following which the pin 52 is broken as previously described. In the rivet as now set, the external surfaces of the pin have a close and sealing fit with respective inner surfaces of the sleeve to obtain a solid and tight rivet.

The inclined surface 90 of the pin 52 which forms one side of the recess 111 that receives the locking ring 70 is provided with serrations 123 which are inclined with respect to the longitudinal axis of pin 52. The serrations 123 correspond to the serrations 37 in the fastener 1 and may be either helical or straight so long as they extend angularly with respect to the longitudinal axis of pin 52. Consequently, as the ring 70 is sheared off the head 68 and moved into the locking recess 111, it is forced axially into engagement with the serrations 123. The serrations 123 are of a size such that they bite into the ring 70, like the serrations 37 bite into ring 24, as shown in FIG. 7, and are firmly embedded therein to provide a mechanical locking of the pin 52 to the ring-shape extension 70 to prevent longitudinal movement of the locking ring 70 relative to the pin 52.

The modified fastener 1a which is shown in FIG. 13 in a finally driven position corresponding to the position of the fastener 1 shown in FIG. 5, is similar in all respects to the fastener 1 except for the shape of the pin 7a. Consequently, like numerals are used on the fasteners 1 and 1a to indicate like parts.

The pin 7a has a head 8, a smooth land 10 adjacent the head 8, and a cylindrical portion 11a which is of substantially constant diameter and extends between the shoulder 12 formed at the inner end of the surface 10 and the breakneck groove 14. This portion 11a is formed with straight serrations 35 adjacent the shoulder 12a and serrations 37 adjacent the breakneck groove 14 which are inclined with respect to the longitudinal axis of the pin 7a. Because the portion 11a is of substantially constant diameter and is, therefore, lacking in the locking groove 13 formed in pin 7, the annular space formed between the pin 7a and the inclined inner cavity 22 of the sleeve 20 is of an inwardly tapering shape as contrasted to the substantially uniform thickness space formed in the fastener 1 when groove 13 is aligned with cavity 22 (FIG. 2). The locking collar 24 is forced into the cavity shown in FIG. 13 so that it is deformed into locking engagement with the serrations 37, with the serrations 37 biting into the annular inner surface of the collar 24 in a manner similar to that illustrated in FIG. 7.

Consequently, in the finally driven position of the fastener 1a, the pin 7a is locked to the sleeve 20 by the serrations 35 and the locking collar or ring 24 is locked against longitudinal movement relative to the pin 7a by the serrations 37 so that accidental loosening of the fastener 1a is prevented.

The modified fastener indicated at 50a in FIG. 14 is likewise similar in all respects to the fastener 50 except for the shape of the pin 52a so that like numerals are used on the fasteners 50 and 50a to indicate like parts. The pin 52a has a head 80 and a cylindrical land 82 adjacent the head 80 which is formed with the serrations 122 on a section 120 thereof spaced from the head 80. Between the breakneck groove 94 and the shoulder 84 at the inner end of the portion 82, the pin is formed with a portion 86a which is of substantially constant diameter. This portion 86a of the pin adjacent the breakneck groove 94 is formed with serrations 123 which extend angularly with respect to the longitudinal axis of the pin 52a. Because the pin 52a is of a substantially constant diameter in the portion 86a thereof, the cavity formed between the portion 86a and the inclined sleeve surface 72 tapers inwardly as shown in FIG. 14 in the finally driven position of the fastener 50a. The locking ring 70 is forced axially into the tapering cavity so that the locking ring 70 is deformed into locking engagement with the serrations 123 so that the serrations 123 bite into the locking ring 70 in a manner similar to the manner in which the serrations 37 bite into the locking collar 24 as shown in FIG. 7. Consequently, in the finally driven position of the fastener 50a, the serrations 122 are embedded in the sleeve 54 to prevent rotation of the pin 52a relative to the sleeve 54 and the serrations 123 are embedded in the locking ring 70 to prevent axial movement of the locking ring 70 relative to the pin 52a. As a result, accidental loosening of the fastener 50a is positively prevented.

From the above description, it is seen that each of the fasteners 1, 1a, 50 and 50a consists of a sleeve assembly, a portion of which is expandable to form a blind head, a pin movable axially relative to the sleeve and a locking ring which is driven into a recess between the pin and the sleeve assembly so as to mechanically lock the pin to the sleeve to prevent relative rotation thereof, and to mechanically lock the pin to the locking ring to prevent relative movement of the locking ring and pin. As a result, in both fasteners, accidental loosening of the pin is positively prevented. It is to be understood that although the sleeves 20 and 54 are illustrated as having flat heads, they may have round or other shaped heads, and that while the serrations 35, 37, 122 and 123 are raised relative to the adjacent portions of the respective pins, the extent of raising is exaggerated somewhat in some instances for purposes of illustration.

It will be understood that the specific construction of the improved fasteners which are herein disclosed and described is presented for purposes of explanation and illustration and is not intended to indicate limits of the invention, the scope of which is defined by the following claims.

What is claimed is:

1. A rivet comprising a tubular body member adapted to project through the opening in a structure to be riveted and having a preformed head at one end which is provided with a central, axially extending aperture terminating in an enlarged generally radially outwardly inclined opening in said preformed head, a pin extending through said aperture in said body member, a first group of serrations formed in said pin and extending radially outwardly beyond the surface of said pin immediately adjacent thereto and defining an outside diameter greater than the diameter of said aperture in said tubular body member, said first group of serrations extending parallel to the longitudinal axis of said pin and being engageable with said body member at a point axially spaced from said preformed head, a second group of serrations formed in a straight cylindrical portion in the surface of said pin and lying in planes intersecting the longitudinal axis of said pin with the included angle between said planes and the longitudinal axis being an acute angle substantially less than ninety degrees and with said second group of serrations located at a point within said enlarged opening in said preformed head, said pin having an enlarged head engageable with the end of said tubular body opposite said preformed head whereby a bulbed head is formed in said tubular body at said opposite end upon the application of a relative axial force between said pin and said tubular body and an axially extending flange projecting from the radially inner edge of said preformed head and adapted to be pressed into the cavity defined by said enlarged opening in said preformed head and said straight cylindrical portion of said pin and into engagement with said second group of serrations.

2. A rivet comprising a tubular body member adapted to project through the opening in a structure to be riveted and having a preformed head at one end which is provided with a central, axially extending aperture terminating in an enlarged generally radially outwardly inclined opening in said preformed head, a pin extending through said aperture in said body member, a first group of serrations formed in said pin and extending radially outwardly beyond the surface of said pin immediately adjacent thereto and defining an outside diameter greater than the diameter of said aperture in said body member, said first group of serration being engageable with said body member at a point axially spaced from said preformed head, said first group of serrations extending substantially parallel to the longitudinal axis of said pin, a second group of serrations formed in a straight cylindrical portion of said pin and located at a point within said enlarged opening in said preformed head and lying in planes intersecting the longitudinal axis of said pin with the included angle between said planes and the longitudinal axis being an acute angle substantially less than ninety degrees, said pin having an enlarged head engageable with the end of said tubular body member opposite said preformed head whereby a bulbed head is formed in said tubular body member at said opposite end upon application of a relative axial force between said pin and said tubular body member, and an annular locking member disposed adjacent said preformed head and which is adapted to be pressed into the cavity defined by said enlarged opening and said straight cylindrical portion on said pin and into engagement with said second group of serrations.

References Cited in the file of this patent

UNITED STATES PATENTS

| | | |
|---|---|---|
| 1,814,966 | Rosenberg | July 14, 1931 |
| 1,996,128 | Thomson | Apr. 2, 1935 |
| 2,058,520 | Sipe | Oct. 27, 1936 |
| 2,177,191 | Sandberg | Oct. 24, 1939 |
| 2,381,113 | Cook | Aug. 7, 1945 |
| 2,400,381 | Rosan | May 14, 1946 |
| 2,466,546 | Huelster | Apr. 5, 1949 |
| 2,526,235 | Huck | Oct. 17, 1950 |
| 2,887,003 | Brilmyer | May 19, 1959 |
| 2,960,902 | De Caro | Nov. 22, 1960 |
| 3,009,177 | Carusi et al. | Nov. 21, 1961 |